(12) United States Patent
El-Shoubary et al.

(10) Patent No.: US 6,765,041 B1
(45) Date of Patent: Jul. 20, 2004

(54) ORGANO-ACID PHOSPHATE TREATED PIGMENTS

(75) Inventors: Modasser El-Shoubary, Crofton, MD (US); Robert J. Kostelnik, Ellicott City, MD (US)

(73) Assignee: Millenium Inorganic Chemicals, Inc., Hunt Valley, MD (US)

( * ) Notice: Subject to any disclaimer, the term of this patent is extended or adjusted under 35 U.S.C. 154(b) by 0 days.

(21) Appl. No.: 09/723,098

(22) Filed: Nov. 27, 2000

(51) Int. Cl.$^7$ .............................. C08K 9/04; B32B 19/02
(52) U.S. Cl. .................. 523/205; 524/431; 427/218; 427/220; 427/384; 428/357; 428/363; 106/436
(58) Field of Search .................. 523/205; 524/431; 427/220, 218, 384; 428/357, 363; 106/436

(56) References Cited

U.S. PATENT DOCUMENTS

| | | | |
|---|---|---|---|
| 3,920,769 A | * | 11/1975 | Yaginuma et al. |
| 4,174,340 A | | 11/1979 | Luders et al. |
| 4,183,843 A | | 1/1980 | Koenig et al. |
| 4,183,879 A | | 1/1980 | Battiste |
| 4,186,028 A | | 1/1980 | Woditsch et al. |
| 4,209,430 A | | 6/1980 | Weber |
| 4,287,333 A | * | 9/1981 | McClain |
| 4,309,333 A | | 1/1982 | Silberberg |
| 4,350,645 A | | 9/1982 | Kurasaki et al. |
| 4,357,170 A | | 11/1982 | Brand |
| 4,377,417 A | | 3/1983 | Brand |
| 4,720,514 A | | 1/1988 | Needham |
| 5,260,353 A | | 11/1993 | Palmer et al. |
| 5,318,625 A | | 6/1994 | Stamel |
| 5,397,391 A | | 3/1995 | Stramel |
| 5,446,482 A | | 8/1995 | Van Aken et al. |
| 5,466,482 A | * | 11/1995 | Johnson |
| 5,553,630 A | | 9/1996 | Dupuis et al. |
| 5,837,049 A | | 11/1998 | Watson et al. |
| 5,876,493 A | | 3/1999 | Menovcik et al. |
| 6,270,563 B1 | * | 8/2001 | Herget et al. |
| 6,340,387 B1 | * | 1/2002 | Orth-Gerber et al. |

FOREIGN PATENT DOCUMENTS

| | | |
|---|---|---|
| DE | 1 234 234 | 2/1967 |
| DE | 3015766 | 10/1981 |
| DE | 197 51 857 A1 | 5/1999 |
| EP | 0 771 857 A2 | 7/1997 |
| WO | WO 99/27011 A2 | 6/1999 |

OTHER PUBLICATIONS

A Comprehensive Treatise on Inorganic and Theoretical Chemistry, vol. XIII, Longsman, Green and Co: London, pp. viii, 971–992 (1931).
Alder and Woodstock, The Alkyl Esters of Phosphoric Acid, Chem. Industries, vol. 51, pp. 516–521, 557 (1942).
XP–002199157, abstract, Asahi, JP 58168663, Oct. 5, 1983.
XP–002199156, abstract, Orient Chem., JP 60190480, Sep. 27, 1985.
XP–002133155, abstract, Dainichiseika, JP 62161862, Jul. 17, 1987.

* cited by examiner

*Primary Examiner*—Tae H. Yoon
(74) *Attorney, Agent, or Firm*—Kalow & Springut LLP; Scott D. Locke, Esq.

(57) ABSTRACT

A unique treatment for pigments is provided. This treatment, which uses certain organo-acid phosphate molecules, imparts improved physical and chemical qualities including lacing resistance, improved dispersion and decreased chemical reactivity when these treated pigments are incorporated into polymeric matrices.

26 Claims, No Drawings

ORGANO-ACID PHOSPHATE TREATED PIGMENTS

BACKGROUND OF THE INVENTION

The present invention relates to novel pigments, and in particular, pigments that have been treated with certain organo-acid phosphate compounds.

The incorporation of pigments into polymer matrices has been performed for many years, and over the years, pigments have been and continue to be incorporated into polymers matrices for many reasons. For example, pigments may be used as fillers. They may also be used to impart better physical and chemical attributes to polymer matrices, including improved thermal stability, especially lacing resistance in extruded polymer film applications, and decreased chemical activity. In order to obtain different benefits, pigments may be treated in different ways, including by adding surface treatments.

Commonly used pigments include titanium dioxide, kaolin and calcium carbonate. Commonly known surface treatments that have been applied to pigments include silanes, alkylphosphonic acids and phosphorylated polyenes. The precise attributes that one wants in a treated pigment will depend in part on the application in which it will be used. Often one wants to provide a hydrophobic pigment that is stable, easy to prepare, cost effective, can be dispersed to a high degree in polymers, and does not react in the presence of other additives such as lithopone.

However, despite the numerous known surface treatments, for various reasons, including cost and desired properties, no known surface treatments are ideal for all applications. Thus, there is always a need to develop new and better treatments for pigments.

One under-explored option for treating pigments is the use of esters of phosphoric acids. These compounds have been suggested to mix with pigments and to form suspensions in, for example, aqueous coatings applications. However, such a use produces a unique product that may be used in a unique application. Thus, the limited teachings for use of esters of phosphoric acids in aqueous coatings applications do not suggest the pigments treated with low levels of organo-acid phosphates of this invention or that the pigments treated with low levels of organo-acid phosphates of this invention would have utility in plastics.

The present invention proides economical and easily prepared novel pigments that possess resistance to lacing when incorporated into polymeric articles (such as films), do not produce objectionable side reactions when mixed with common plastics additives such as lithopone, which contains zinc sulfide, and are stable such that they possess low levels of extractable organics. Durable plastics products that incorporate the treated pigments of the present invention resist yellowing when phenolic-type antioxidants are used. In addition, a polymer matrix containing up to about 85% of organo-acid phosphate treated titanium dioxide pigment, based on the weight of the polymer may be produced. The polymer matrix may be an end-product in and of itself or a product that will be further processed such as in a masterbatch, which can be let down into a polymeric film.

SUMMARY OF THE INVENTION

The present invention provides novel treated pigments for use in polymer matrices. The treated pigments of the present invention are organo-acid phosphate treated compounds comprising a pigmentary base that may be treated with the reaction products of: (1) at least one organic alcohol; and (2) $P_2O_5$ and/or phosphoric acid. The phrases "at least one organic alcohol" and "organic alcohols" mean one or more types of organic alcohols, for example, a solution of hexanol or octanol or a mixture of hexanol and octanol. The organic alcohols, $P_2O_5$ and phosphoric acid are selected such that their reaction products include an organo-acid phosphate that may be represented by the formula:

$$(R-O)_xPO(OH)_y$$

wherein x=1 or 2;

y=3−x; and

R is an organic group having from 2 to 22 carbon atoms. Alternatively, one may start with the organo-acid phosphate directly if it is available, rather than produce it from the reactants described above.

The treated pigments of the present invention may be combined with and readily dispersed into polymers to form polymer matrices. These polymer matrices have improved physical properties such as impact strength, tensile strength and flexural characteristics.

The treated pigments of the present invention may also be used to prepare highly loaded polymer masterbatches. These highly loaded masterbatches are especially useful in applications in which dispersion and thermal stability, especially resistance to lacing, are critical.

Based on the foregoing, there is still a need for better treated pigments. The treated pigments of the present invention have the advantages of being hydrophobic pigments that are stable, easy to prepare, cost effective, can be dispersed to a high degree in polymers, and do not react in the presence of other additives such as lithopone. Such treated pigments may be useful in the manufacture of plastics and other products.

DETAILED DESCRIPTION OF THE INVENTION

The present invention provides novel pigments for use in connection with polymers and offers several benefits over currently used pigments. According to the present invention pigments are treated with the reaction products of: (1) at least one organic alcohol; and (2) $P_2O_5$ and/or phosphoric acid. The resulting treated pigments may then be combined with polymers to form novel polymer matrices.

The present disclosure is not intended to be a treatise on either pigments or the production of polymers matrices and readers are referred to appropriate, available texts and other materials in the field for additional and detailed information on any aspect of practicing this invention.

Suitable pigmentary bases for use in the present invention include titanium dioxide, kaolin, talc, mica and calcium carbonate. The phrase "pigmentary base" as used herein refers to the pigment that has not been treated with an organo-acid phosphate compound. Preferably, titanium dioxide is the chosen pigmentary base. When the pigmentary base is titanium dioxide, the titanium dioxide may be either rutile or anatase, both of which may be produced by processes that are well known to those skilled in the art.

Organic alcohols, and $P_2O_5$ and/or phosphoric acid may be reacted to form organo-acid phosphates. The organic alcohols useful in the present invention may have hydrocarbon groups from about 2 to about 22 carbon atoms. Some examples of the organic alcohols suitable for use in the present invention include, ethanol, propanol, butanol, isobutanol, tertiary butanol, pentanol, hexanol, heptanol, octanol, 2-ethylhexanol, decanol, dodecanol and the like. Preferably the alcohol is a linear hexanol, a linear octanol or 2-ethylhexanol. They may be combined with either or both $P_2O_5$ and phosphoric acid. The conditions under which to react these materials in order to form the organo-acid phosphate are generally known or knowable to those skilled in the art.

Rather than beginning with the organic alcohols and $P_2O_5$ and/or phosphoric acid, one may start directly with the organo-acid phosphate of the below formula (Formula I):

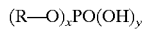

$$(R\text{—}O)_x PO(OH)_y$$

wherein x=1 or 2;

y=3–x; and

R is an organic group having from 2 to 22 carbon atoms. Preferably R is a linear hexyl- or octyl-aliphatic group or a branched octyl-aliphatic group. For example, R may be an ethylhexyl-group. The use of hexyl-, octyl- or ethylhexyl-aliphatic groups will result in excellent pigmentary performance.

Organo-acid phosphates are available commercially through, for example, Albright & Wilson Americas of Glen Allen, Va. or may be prepared by procedures known or knowable to those skilled in the art such as those procedures disclosed in U.S. Pat. No. 4,350,645, issued on Sep. 21, 1982 to Kuroaki el al., the teachings of which are incorporated by reference.

The organo-acid phosphate, which is the surface treatment of the present invention will be used to treat the pigmentary base and to form a treated pigment. The phrase "treated pigment" refers to any pigmentary base that has been surface treated or modified. The phrase "organo-acid phosphate treated pigment" refers to a pigmentary base that has been treated with the organo-acid phosphate of the reaction products of organic alcohols and $P_2O_5$ and/or phosphoric acid or an organo-acid phosphate that may be represented by the above Formula I. The level of organo-acid phosphate used to treat the pigmentary base may range from about 0.01 percent to about 5 percent by weight, based on the weight of the pigmentary base; more preferably from about 0.3 percent to about 2.0 percent; and most preferably from about 0.4 percent to about 1.2 percent.

In the organo-acid phosphate treated pigment, the organo-acid phosphate may interact with the pigment in a number of manners such as through hydrogen bonding and/or covalent attachments such that the surface treatment resists extraction from the treated pigment. The organo-acid phosphates that are the reaction products of the organic alcohols, and $P_2O_5$ and/or phosphoric acid are generally mixtures of mono- and di-substituted esters in combination with orthophosphoric acid.

The process for making the organo-acid phosphate treated pigment is easily and flexibly incorporated into existing pigment production processes. Preferably the combining of the pigmentary base and the surface treatment of the invention will occur at a temperature of from about 10° C. to about 270° C. The temperature at which the pigmentary base and the surface treatment are combined is dependent on the step in the pigment production process in at which the surface treatment is added.

A by-product of the reaction between the organo-acid phosphate and the pigment is thought to be water. Because water is the by-product, the organo-acid phosphate may be added at any one of, or several of, the operations in the pigment production process. For example, the organo-acid phosphate may be added to a washed filter cake prior to spray drying, to a high intensity milling device or to a micronizer feed prior to or concurrent with micronization. It is not as effective to add the organo-acid phosphate to a pigment slurry prior to filtration and washing since a portion of the organo-acid phosphate will be lost upon washing of the pigment. The organo-acid phosphate can be added to a washed filter cake at normal process operating temperatures. If the organo-acid phosphate is a solid substance, it may be dissolved in an appropriate solvent, such as water, alcohol, tetrahydrofurn, etc., before being added to the pigmentary base. It is desirable to add the organo-acid phosphate to a fluidized, washed filter cake with agitation in order to assure uniform mixing of the organo-acid phosphate among the pigment particles. The pH of the fluidized filter cake prior to addition of the organo-acid phosphate is not critical, and normal operating pH values are acceptable. These values are known or readily knowable to those skilled in the art. If the organo-acid phosphate is added to a dry pigment such as a spray drier product or micronizer feed, care must be taken to ensure uniform mixing of the organo-acid phosphate with the pigment powder.

Devices such as a V-shell blender equipped with an intensifier bar for application of the liquid organic or other suitable mixing devices known to those in the art may be used. Alternatively, the organo-acid phosphate may be metered into the micronizer along with the pigment powder to be ground. Air or steam micronization techniques may be used at temperatures from room temperature up to 250° C. or higher as is known or easily knowable to those skilled in the art.

If one adds the organo-acid phosphates of the present invention to the filter cake or to the micronizer feed, one will minimize the loss of the organic portion of the surface treatment and thereby improve manufacturing efficiency. The treated pigment may be fluid energy milled using steam or air to produce finished pigments that retain high levels of the organo-acid phosphate compound, which would reduce the overall cost of producing the treated pigment.

When, for example, the pigment is titanium dioxide, the organo-acid phosphates may be added to the untreated titanium dioxide directly obtained directly from a production process such as the chloride or sulfate processes. Alternatively, the pigmentary base titanium dioxide may be further treated with additional metal oxides, such as aluminum oxide, silicon dioxide, zirconium oxide and the like, using any process known to those skilled in the art, prior to treatment with the organo-acid phosphates of the present invention. Additionally, the untreated pigmentary base or the treated pigment may be secondarily treated with polyalcohols such as trimethylolethane and trimethylolpropane or alkanolamines such as triethanolamine.

Once the organo-acid phosphate treated pigment is formed, it may then be combined with a polymer. The nature of the surface treatment of the present invention allows the treated pigments to be easily incorporated into a polymer matrix. The phrase "polymer matrix" refers to the substance comprising of the polymer and the treated pigment. Polymers that may be of use in the present invention include polymers of unsubstituted ethylene monomers, including polyethylene, polypropylene, polybutylene, and copolymers of ethylene with alpha-olefins containing 4 to 12 carbon atoms or vinyl acetate; vinyl homopolymers, acrylic homopolymers and copolymers, polyamides, polycarbonates, polystyrene, acrylonitrile-butadienestyrenes and polyethers. Other suitable polymer types also include polyvinylchloride, polyurethanes, polysulfones, polyimides, polyesters and chlorinated polyesters, polyoxyethylenes, phenolics, alklyds, amino resins, epoxy resins, phenoxy resins and acetal resins.

The treated pigment may be combined with the polymer and have a loading of up to about 85% by weight, based on the weight of the polymer matrix. Preferably a loading of treated pigment of about 50% to about 85% by weight based on the weight of the polymer matrix is used. This loading may be used as a masterbatch. A "masterbatch" is meant to refer to a mixture of 2 or more substances that are blended together and then blended with one or more other ingredients that may be the same or different as either of the first two substances. The methods for creating a masterbatch with the treated pigment are known or easily known to those skilled in the art. For example, the masterbatch may be created by combining the treated pigment and the polymer using a BR Banbury Mixer.

It has been found, surprisingly and unexpectedly, that the treated pigments of this invention do not generate potentially hazardous or noxious gases when used in combination with the polymeric filler lithopone, which contains combinations of zinc sulfide and barium sulfate. By contrast, when one uses phosphorylated polyenes in combination with lithopone a potentially hazardous gas is emitted.

It has also been found, surprisingly and unexpectedly that the treated pigments of this invention impart greater lacing resistance to polymers into which they are incorporated. Lacing, which is a believed to be a measure of volatility at specific weight percent pigment loadings and processing temperatures, may manifest as a void or hole in a plastic film.

EXAMPLES

The following examples set forth preferred embodiments of the invention. These embodiments are merely illustrative and are not intended and should not be construed to limit the claimed invention in any way.

Example 1
Octyl Acid Phosphate Prepared in Accordance with U.S. Pat. No. 4,350,645

To 65.12 g of 1-octanol (0.5 mol) and 9.0 g of water (0.5 mol), phosphorous pentoxide (70.96 g 0.5 mol) was added gradually with vigorous stirring while maintaining the temperature below 80° C. The reaction mixture was stirred for 3 hours at 80° C. Subsequently, another 65.12 g of 1-octanol (0.5 mol) was added. The mixture continued to stir for another 10 hours at 80° C.

The resulting mixture was analyzed via titration methods, following the teachings of International Patent Application Serial Number PCT/JP95/01891 and found to yield 63–68% mono octyl acid phosphate, ~21% dioctyl acid phosphate and ~7% phosphoric acid.

Example 2
Hexyl Acid Phosphate

Example 1 was repeated using 1-hexanol in place of the 1-octanol. The final product contains the presence of 60% monohexyl acid phosphate, 18% dihexyl acid phosphate, and ~12% phosphoric acid.

Example 3
Polymer Matrices From Octyl Acid Phosphate Treated $TiO_2$ (Chloride Process)

51.8 mls of a 386.4 grams $Al_2O_3$/liter solution of sodium aluminate were added to 5000 grams of the $TiO_2$ in a 350 grams/liter slurry with mixing at 70° C. The pH was adjusted to 7.0 using a 50% sodium hydroxide solution, and the slurry was allowed to age for 30 minutes.

The aged slurry was filtered and washed three times with 5000 ml aliquots of 80° C. deionized water, and then dried overnight at 115° C. in a drying oven.

The dried filter cake was forced through an 8-mesh sieve prior to treatment with octyl acid phosphate 8.4 grams of the reaction product of octanol, $P_2O_5$ and phosphoric acid from Example 1 were added drop-wise to 1200 grams of the dry, 8 meshed, alumina coated $TiO_2$, which was spread to a 1-cm thickness on polyethylene film. The pigment was mixed and transferred to a one gallon wide-mouthed plastic bottle and agitated for 10 minutes on a roller mill. The resulting material was steam micronized to produce the finished pigment.

The finished pigment as incorporated into a low-density polyethylene in 75%, and 50% masterbatches for dispersion and lacing evaluations. Results are given in Table 1 below.

Example 4
Polymer Matrices From Octyl Acid Phosphate Treated $TiO_2$ (Sulfate Process)

51.8 ml of a 386.4 grams $Al_2O_3$/liter solution of sodium aluminate were added to 5000 grams of fine particle sulfate process rutile $TiO_2$ in a 350 grams/liter slurry with mixing at 70° C. The slurry pH was adjusted to 7.0 using a 50% sodium hydroxide solution, and the slurry was allowed to age for 30 minutes. The aged slurry was filtered and washed three times with 5000 ml aliquots of 80° C. deionized water and dried overnight at 115° C.

The dried filter cake was forced through an 8-mesh sieve in preparation for treatment with octyl acid phosphate. 8.4 grams of the octyl acid phosphate product were added dropwise from a syringe to 1200 grams of the dry, 8 meshed, alumina coated $TiO_2$ spread to a 1 cm thickness on polyethylene film. The pigment was mixed and transferred to a one gallon wide-mouthed bottle and agitated for 10 minutes on a roller mill. The raw pigment was steam micronized to produce the finished pigment.

The finished pigment was incorporated into 75% and 50% $TiO_2$ based masterbatches containing low-density polyethylene for dispersion and lacing evaluations. Results are given in Table 1 below.

Comparative Example 1

Rutile $TiO_2$, prepared by the chloride process, coated with hydrous alumina as described in Example 3 was treated with 0.60% by weight triethanolamine based on the weight of dry pigment. The triethanolamine treated pigment was steam micronized to produce the finished pigment.

The finished pigment was incorporated into 75% and 50% $TiO_2$ containing low-density polyethylene masterbatches for dispersion and lacing evaluations. Results are given in Table 1 below.

Comparative Example 2

A sulfate process rutile $TiO_2$ base was coated with alumina as described in Example 4. The organic treatment applied to the dry, 8-meshed alumina coated, sulfate process $TiO_2$ was 0.60% by weight triethanolamine based upon the weight of the dry pigment. The triethanolamine treated pigment was steam micronized to produce the finished pigment. The finished pigment was incorporated into 75% and 50% $TiO_2$ masterbatches for dispersion and lacing evaluations. Results are given in Table 1 below.

TABLE 1

|  | Dispersion (Counts/Second) | Lacing |
|---|---|---|
| Example 3 | 1,750 | 1.7 |
| Example 4 | 5,140 | 1.5 |
| Comparative Example 1 | 13,700 | 1.4 |
| Comparative Example 2 | 24,000 | 1.2 |

The data illustrate that dispersion performance of both chloride and sulfate process-based pigments, treated with the octyl acid phosphate reaction product (Examples 3 and 4), is dramatically improved over like pigmentary bases treated with a conventional, commercially used organic treatment, triethanolamine (comparative Examples 1 and 2). Further, the excellent dispersion performance is obtained with no significant decay in resistance to lacing. The standard error for the lacing measurement is about 0.1 to 0.2.

Examples 5–21

Dispersion and Lacing

In the following examples (Examples 5–21), the organo-acid phosphate was added to a dry, chloride process base rutile $TiO_2$ further treated with 0.20% by weight of alumina, prior to micronization. The organo-acid phosphate ester was added as a neat liquid or in solution if the organo-acid phosphate was a solid material. The general preparation method used for producing the organo-acid phosphate, alumina treated pigmentary base was as follows:

25.9 mls of a 386.4 grams $Al_2O_3$/liter solution of sodium aluminate were added with mixing to 5000 grams of the $TiO_2$ in a 350 grams/liter slurry at 70° C. The pH was adjusted to 7.0 using a 50% sodium hydroxide solution, and the slurry was allowed to age for 30 minutes.

The aged slurry was filtered and washed three times with 5000 ml aliquots of 80° C. deionized water, and then dried overnight at 115° C. in a drying oven. The dried filter cake was forced through an 8-mesh sieve prior to treatment with the organo-acid phosphate. The desired amount of organo-acid phosphate was added dropwise to 1200 grams of the dry, 8 meshed, alumina coated $TiO_2$, which was spread to a 1-cm thickness on polyethylene film. If the organo-acid phosphate was a solid material, it was dissolved in tetrahydrofuran (THF) prior to application to the dry pigment, and the THF was allowed to evaporate. The pigment was mixed and transferred to a one gallon wide-mouthed plastic bottle and agitated for 10 minutes on a roller mill. The resulting material was steam micronized to produce the finished pigment.

Example 5—0.9% Octyl Acid Phosphate Treated $TiO_2$

The pigmentary base prepared according to the above-described method was treated with 0.9% octyl acid phosphate prepared according to Example 1 and steam micronized to produce the final product. The finished pigment was incorporated into low-density polyethylene in 75% and 50% masterbatches for dispersion and lacing evaluations. Dispersion results were 780 XRF counts of $TiO_2$/sec and lacing was rated a 1.5.

Example 6—1.1% Octyl Acid Phosphate Treated $TiO_2$

The pigmentary base prepared according to the above-described method it was treated with 1.1% octyl acid phosphate prepared according to Example 1 and steam micronized to produce the final product. The finished pigment was incorporated into low-density polyethylene in 75% and 50% masterbatches for dispersion and lacing evaluations. Dispersion results were 1,080 XRF counts of $TiO_2$/sec and lacing as rated 1.3.

Example 7—0.90% Hexyl Acid Phosphate Treated $TiO_2$

The pigmentary base prepared according to the above-described method was treated with 0.9% hexyl acid phosphate prepared according to the method of Example 2 and steam micronized to produce the final product. The finished pigment was incorporated into low-density polyethylene in 75% and 50% masterbatches for dispersion and lacing evaluations. Dispersion results were 1,260 XRF counts of $TiO_2$/sec and lacing was rated 1.3.

Example 8—1.1% Hexyl Acid Phosphate Treated $TiO_2$

The pigmentary base prepared according to the above-described method was treated with 1.1% hexyl acid phosphate prepared according to the method of Example 2 and steam micronized to produce the final product. The finished pigment was incorporated into low-density polyethylene in 75% and 50% masterbatches for dispersion and lacing evaluations. Dispersion results were 1,310 XPF counts of $TiO_2$/sec and lacing was rated 1.2.

Example 9—0.5% Butyl Acid Phosphate Treated $TiO_2$

The pigmentary base prepared according to the above-described method was treated with 0.5% butyl acid phosphate obtained from Albright and Wilson Americas and steam micronized to produce the final product. The finished pigment was incorporated into a 75% by weight low-density polyethylene masterbatch for dispersion evaluation. The dispersion result was 12,720 XRF counts of $TiO_2$/sec.

Example 10—0.7% Butyl Acid Phosphate Treated $TiO_2$

The pigmentary base prepared according to the above-described method was treated with 0.7% butyl acid phosphate obtained from Albright and Wilson Americas and steam micronized to produce the final product. The finished pigment was incorporated into a 75% by weight low-density polyethylene masterbatch for dispersion evaluation. The dispersion result was 2,180 XRF counts of $TiO_2$/sec.

Example 11—0.90% Butyl Acid Phosphate Treated $TiO_2$

The pigmentary base prepared according to the above-described method was treated with 0.9% butyl acid phosphate obtained from Albright and Wilson Americas and steam micronized to produce the final product. The finished pigment was incorporated into a 75% by weight low-density polyethylene masterbatch for dispersion evaluation. The dispersion result was 1,030 XRF counts of $TiO_2$/sec.

Example 12—0.9% 2-Ethylhexyl Acid Phosphate Treated $TiO_2$

The pigmentary base prepared according to the above-described method was treated with 0.9% 2-ethylhexyl acid phosphate, which was commercially available from Specialty Industrial Products, Inc. under the tradename Sipophos 2EHP, and steam micronized to produce the final product. The finished pigment was incorporated into a 75% by weight low-density polyethylene masterbatch for dispersion evaluation. The dispersion result was 790 XRF counts of $TiO_2$/sec.

Example 13 1.1% 2-Ethylhexyl Acid Phosphate Treated $TiO_2$

The pigmentary base prepared according to the above-described method was treated with 1.1% 2-ethylhexyl acid phosphate, which was commercially available from Specialty Industrial Products, Inc. under the tradename Sipophos 2EHP, and steam micronized to produce the final product. The finished pigment was incorporated into a 75% by weight low-density polyethylene masterbatch for dispersion evaluation. The dispersion result was 280 XRF counts of $TiO_2$ sec.

Example 14—0.9% Cetyl Acid Phosphate Treated $TiO_2$

The pigmentary base prepared according to the above-described method was treated with 0.9% cetyl acid phosphate, which was commercially available from Colonial Chemical Company under the tradename Colafax CPE, and steam micronized to produce the final product. The finished pigment was incorporated into a 75% by weight low-density polyethylene masterbatch for dispersion evaluation. The dispersion result was 15,140 XRF counts of $TiO_2$/sec.

Example 15—1.1% Cetyl Acid Phosphate Treated $TiO_2$

The pigmentary base prepared according to the above-described method was treated with 1.1% cetyl acid phosphate, which was commercially available from Colonial Chemical Company under the tradename Colafax CPE, and steam micronized to produce the final product. The finished pigment was incorporated into a 75% by weight low-density polyethylene masterbatch for dispersion evaluation. The dispersion result was 2,970 XRF counts of $TiO_2$/sec.

Example 16—0.7% Oleyl Acid Phosphate Treated $TiO_2$

The pigmentary base prepared according to the above-described method was treated with 0.7% oleyl acid phosphate, which was commercially available from Albright & Wilson Americas under the tradename DURAPHOS APO-128, and steam micronized to produce the final product. The finished pigment was incorporated into a 75% by weight low-density polyethylene masterbatch for dispersion evaluation. The dispersion result was 25,730 XRF counts of $TiO_2$/sec.

Example 17—0.9% Oleyl Acid Phosphate Treated $TiO_2$

The pigmentary base prepared according to the above-described method was treated with 0.9% oleyl acid phosphate, which was commercially available from Albright & Wilson Americas under the tradename DURAPHOS APO-128, and steam micronized to produce the final product. The finished pigment was incorporated into a 75% by weight low-density polyethylene masterbatch for dispersion evaluation. The dispersion result was 20,720 XRF counts of $TiO_2$/sec.

Example 18—0.5% Bis(2-ethylhexyl) Acid Phosphate Treated $TiO_2$

The pigmentary base prepared according to the above-described method was treated with 0.5% bis(2-ethylhexyl) acid phosphate, which was commercially available from Albright & Wilson Americas, and steam micronized to produce the final product. The finished pigment was incorporated into a 75% by weight low-density polyethylene masterbatch for dispersion evaluation. The dispersion result was 5,610 XRF counts of $TiO_2$/sec.

Example 19—0.7% Bis(2-ethylhexyl) Acid Phosphate Treated $TiO_2$

The pigmentary base prepared according to the above-described method was treated with 0.7% bis(2-ethylhexyl) acid phosphate, which was commercially available from Albright & Wilson Americas, and steam micronized to produce the final product. The finished pigment was incorporated into a 75% by weight low-density polyethylene masterbatch for dispersion evaluation. The dispersion result was 1,120 XRF counts of $TiO_2$/sec.

Example 20—0.9% Bis(2-ethylhexyl) Acid Phosphate Treated $TiO_2$

The pigmentary base prepared according to the above-described method was treated with 0.9% bis(2-ethylhexyl) acid phosphate, which was commercially available from Albright & Wilson Americas, and steam micronized to produce the final product. The finished pigment was incorporated into a 75% by weight low-density polyethylene masterbatch for dispersion evaluation. The dispersion result was 1,530 XRF counts of $TiO_2$/sec.

Example 21—1.1% Bis(2-ethylhexyl) Acid Phosphate Treated $TiO_2$

The pigmentary base prepared according to the above-described method was treated with 1.1% bis(2-ethylhexyl) acid phosphate, which was commercially available from Albright & Wilson Americas, and steam micronized to produce the final product. The finished pigment was incorporated into a 75% by weight low-density polyethylene masterbatch for dispersion evaluation. The dispersion result was 1,070 XRF counts of $TiO_2$/sec.

Lacing Evaluations

The high temperature stability of polymers containing pigments is an important property of commercial polymer films, especially polyethylene film applications. Voiding or "lacing" accompanies the failure of films. Lacing is believed to be a measure of volatility at specific weight percent pigment loadings and processing temperatures.

For the present invention, lacing tests were conducted on 50% $TiO_2$ concentrate samples prepared using a Haake Rheocord 9000 Computer Controlled Torque Rheometer. Thus, 125 g of $TiO_2$ and 125 g of LDPE 722 manufactured by Dow Chemical Company were dry blended and added to the 75° C. preheated chamber with rotors running at 50 rpm. One minute after addition of the $TiO_2$/LDPE mixture, the chamber temperature was raised to 105° C. Frictional heat generated by the mixing process was allowed to drive the rate of incorporation of the $TiO_2$ into the LDPE until a steady state mixture was achieved. The concentrate was removed from the mixing chamber and placed into a Cumberland Crusher to obtain finely granulated 50% concentrate samples. The granulated concentrates were conditioned for 48 hours at 23° C. and 50% relative humidity. These concentrates were then let down into Dow Chemical 722 LDPE to achieve a 20% loading of $TiO_2$ in the final film.

Lacing evaluations were run on 1" extruder equipped with a cast film slot die. A temperature profile of 625° F. die, 515°

F. clamp ring, 415° F. zone 3, 350° F. zone 2, and 300° F. zone 1 was used. The screw speed was set at about 90 rpm. A 25.4 cm polished chrome chill roll, set in conjunction with the extruder was used to maintain a 75-μm-film thickness, and to cool and transport the films. The chill roll distance from the die lips was about 22 mm and the temperature was about 27° C.

After the $TiO_2$/LDPE mix was placed in the hopper, the material was allowed to purge until the appearance of a white tint in the film was first noted. To ensure the concentration of $TiO_2$ in the film had stabilized, a time interval of two minutes was allowed before lacing observations were recorded and a film sample obtained. The extruder was then purged with LDPE until the film turned clear. Lacing performance was determined by counting the relative size and number of holes generated in a film sample laid out on a dark surface. A 1.0–3.0 rating system was used. A rating of 1 was given to films with no lacing, 2 was given to films showing the onset of lacing and 3 was given to films with extreme lacing. Increments of 0.1 were used to give an indication of the relative performance between the samples.

Dispersion Testing

Using a small-scale laboratory extrusion apparatus, a measure of pigment dispersion into organic polymers was obtained by measuring the relative amount of pigment trapped onto screens of extruder screen packs. Tests were made using 75% $TiO_2$ concentrates in low density polyethylene prepared using a Haake 3000 Rheomix mixer. The mixer was controlled and monitored with a Haake 9000 Rheocord Torque Rheometer. 337.7 grams of micronized $TiO_2$ and 112.6 grams of NA209 LDPE manufactured by Equistar were dry blended and added to the 75° C. mixing chamber with rotors operating at 50 rpm. The mixer temperature was programmed to increase to 120° C. one minute after the dry blend was introduced to the mixing chamber. After a steady state mixture was achieved, the compound was mixed for an additional 3 minutes. The compound was removed from the chamber and granulated using a Cumberland crusher.

Dispersion tests were conducted using a Killion single screw extruder, model KL-100 equipped with a 20:1 length to diameter screw. The extruder was preheated at 330, 350, 390 and 380° F. from zone 1 to the die, respectively, and operated at 70 rpm. A purge of 1000 grams of NA952 LDPE manufactured by Equistar was run through the system, and a new screen pack was installed. The screen pack consisted of 40/500/200/100 mesh screens from the die towards the extruder throat. After temperature stabilization, 133.33 grams of granulated 75% $TiO_2$ concentrate was fed into the extruder. This was followed with 1500 grams of NA952 purge as the feed hopper emptied. After the LDPE purge was extruded, the screens were removed, separated and tested using a relative count technique from the measurements from an X-ray fluorescence spectrometer. The number of $TiO_2$ counts per second was obtained for the 100, 200 and 500 mesh screens in the pack and totaled to obtain the dispersion result. A count result of less than 5000 is considered to represent excellent dispersion.

Reactivity with Zinc Sulfide (Reactive Component in Lithopone)

Lithopone, a composition containing zinc sulfide is used as a filler and extender in various polymer compositions. When a $TiO_2$ pigment treated with a phosphorlated polyene is contacted with zinc sulfide at temperatures greater than about 20 to 25° C., noxious odors are generated. In contrast, no odors are generated when pigments of the present invention are contacted with zinc sulfide under the same conditions.

Zinc Sulfide Reactivity

Example 22

5 grams of Millennium Chemicals RCL-4 (lot # 234C4DQ), a pigment product comprising titanium dioxide and a phosphorylated polyene, were placed in a sealed vial with 1 g of zinc sulfide. The vial was heated to 195° C. for 10 minutes. Noxious vapors emanating from the vial were injected in to a Hewlett-Packard GC-MS and dimethyl disulfide and dimethyl trisulfide were detected.

Example 23

5 grams of the pigment as prepared in Example 3 were placed in a sealed vial with 1 g of zinc sulfide. The vial was heated to 195° C. for 10 minutes. No noxious odors were detected nor were sulfur components detected via GC-MS.

Extraction of Finished Pigments

Samples of finished pigments from Examples 3 and 4 were extracted using Soxhlet extraction procedures with hexane, tetrahydrofuran and a 10%:90% ethanol:water (W/W) mixture as extraction solvents. The carbon contents of the dried pigments were determined both before and after extraction. Results are shown below in Table 2.

TABLE 2

|  | Example 3 | Example 4 |
| --- | --- | --- |
| % Carbon |  |  |
| theoretical | 0.31 | 0.31 |
| before extraction | 0.28 | 0.28 |
| after hexane extraction | 0.28 | 0.27 |
| after THF extraction | 0.29 | 0.27 |
| after EtOH: $H_2O$ extraction | 0.28 | 0.25 |

Based on the extraction results, the organo-acid phosphate is apparently strongly bonded to the $TiO_2$ pigment since carbons levels of the treated pigment are not significantly affected by extraction. Further, the octyl-acid phosphate appears not to be appreciably hydrolyzed during the high temperature steam micronization process since over 90% of the added carbon remains attached to the pigment after micronization. It would be expected that hydrolysis of the acid phosphate would liberate octanol, which is volatile and would evaporate during micronization.

Having thus described and exemplified the invention with a certain degree of particularity, it should be appreciated that the following claims are not to be so limited but are to be afforded a scope commensurate with the wording of each element of the claim and equivalents thereof.

What is claimed is:

1. A polymer matrix composition for plastics applications comprising:

(a) a pigment, said pigment comprising an inorganic pigmentary base that has been treated with an organo-acid phosphate compound having the formula:

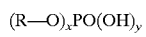

wherein
x=1 or 2, y=3−x, and

R is an organic group having from 2 to 22 carbon atoms; and (b) a polymer, wherein said polymer matrix has an essential absence of water and an essential absence of organic solvents.

2. The polymer matrix of claim 1, wherein said polymer is selected from the group consisting of polyethylene, copolymers of ethylene with alpha-olefins containing 4 to 12 carbon atoms, polypropylene, polycarbonates and polystyrene.

3. The polymer matrix of claim 2, wherein said polymer is polyethylene.

4. The polymer matrix of claim 1, wherein said pigment comprises 50–85% by weight of the polymer matrix based on the weight of the polymer matrix.

5. The polymer matrix of claim 1, wherein R is an organic group having six carbon atoms.

6. The polymer matrix of claim 1, wherein R is an organic group having eight carbon atoms.

7. The polymer matrix of claim 1, wherein R is 2-ethylhexyl-.

8. The polymer matrix of claim 1, wherein the pigmentary base is selected from the group consisting of titanium dioxide, kaolin, talc, mica and calcium carbonate.

9. The polymer matrix of claim 8, wherein the pigmentary base is titanium dioxide.

10. The polymer matrix of claim 1, the amount of organo-acid phosphate compound in the pigment is from about 0.01 percent to about 5 percent by weight, based on the weight of the pigmentary base.

11. A polymer matrix composition for plastics applications comprising:

(a) a pigment, said pigment comprising an inorganic pigmentary base that has been treated with an organo-acid phosphate compound having the formula:

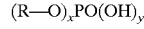

wherein
x=1 or 2,
y=3−x, and
R is an organic group having from 2 to 22 carbon atoms;

(b) a polymer; and (c) at least one compound selected from the group consisting of metal oxides, polyalcohols and alkanolamines, wherein said polymer matrix has an essential absence of water and an essential absence of organic solvents.

12. The polymer matrix of claim 11, wherein said polymer is selected from the group consisting of polyethylene, copolymers of ethylene with alpha-olefins containing 4 to 12 carbon atoms, polypropylene, polycarbonates and polystyrene.

13. The polymer matrix of claim 12, wherein said polymer is polyethylene.

14. The polymer matrix of claim 11, wherein said pigment comprises 50–85% by weight of the polymer matrix based on the weight of the polymer matrix.

15. The polymer matrix of claim 11, wherein R is an organic group having six carbon atoms.

16. The polymer matrix of claim 11, wherein R is an organic group having eight carbon atoms.

17. The polymer matrix of claim 11, wherein R is 2-ethylhexyl-.

18. The polymer matrix of claim 11, wherein the pigmentary base is selected from the group consisting of titanium dioxide, kaolin, talc, mica and calcium carbonate.

19. The polymer matrix of claim 18, wherein the pigmentary base is titanium dioxide.

20. The polymer matrix of claim 11, wherein the amount of organo-acid phosphate compound in the pigment is from about 0.01 percent to about 5 percent by weight, based on the weight of the pigmentary base.

21. The polymer matrix of claim 11, wherein the compound of (c) is a metal oxide and the metal oxide is selected from the group consisting of aluminum oxide, silicon dioxide and zirconium oxide.

22. The polymer matrix of claim 11, wherein the compound of (c) is a polyalcohol and the polyalcohol is selected from the group consisting of trimethylolethane and trimethylolpropane.

23. The polymer matrix of claim 11, wherein the compound of (c) is an alkanolamine.

24. The polymer matrix of claim 23, wherein the alkanolamine is triethanolamine.

25. A polymer matrix composition for use in plastics applications comprising:

(a) a pigment, said pigment comprising a titanium dioxide base that has been treated with an organo-acid phosphate compound having the formula:

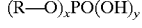

wherein
x=1 or 2,
y=3−x, and
R is an organic group having from 2 to 22 carbon atoms; and (b) polyethylene, wherein said polymer matrix has an essential absence of water and an essential absence of organic solvents.

26. A polymer matrix composition for use in plastics applications comprising:

(a) a pigment, said pigment comprising a titanium dioxide base that has been treated with an organo-acid phosphate compound having the formula:

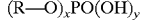

wherein
x=1 or 2,
y=3−x, and
R is an organic group having from 2 to 22 carbon atoms;

(b) polyethylene; and (c) at least one compound selected from the group consisting of metal oxides, polyalcohols and alkanolamines, wherein said polymer matrix has an essential absence of water and an essential absence of organic solvents.

* * * * *